United States Patent
Cunha et al.

(10) Patent No.: US 6,918,258 B2
(45) Date of Patent: Jul. 19, 2005

(54) SEMI-FROZEN BEVERAGE DISPENSING APPARATUS

(75) Inventors: James P. Cunha, Westford, MA (US); Dennis J. Cohlmia, Wichita, KS (US); James A. Steinbacher, Arkansas City, KS (US); Joel D. Hockenbury, Arkansas City, KS (US)

(73) Assignee: Kan-Pak, LLC, Arkansas City, KS (US)

( * ) Notice: Subject to any disclaimer, the term of this patent is extended or adjusted under 35 U.S.C. 154(b) by 0 days.

(21) Appl. No.: 10/615,755

(22) Filed: Jul. 9, 2003

(65) Prior Publication Data

US 2004/0060307 A1 Apr. 1, 2004

Related U.S. Application Data

(62) Division of application No. 10/261,846, filed on Sep. 30, 2002, now Pat. No. 6,705,106.

(51) Int. Cl.⁷ .................................. A23G 9/12
(52) U.S. Cl. .................................. 62/68; 62/342
(58) Field of Search ...................... 62/68, 342, 343

(56) References Cited

U.S. PATENT DOCUMENTS

| | | | | |
|---|---|---|---|---|
| 3,044,878 A | * | 7/1962 | Knedlik | 426/477 |
| 3,528,587 A | | 9/1970 | Popinski | 222/56 |
| 3,638,392 A | | 2/1972 | Welker, Jr. et al. | 53/123 |
| 3,656,316 A | | 4/1972 | Stock | 62/306 |
| 3,874,189 A | | 4/1975 | Calim | 62/306 |
| 3,898,859 A | | 8/1975 | Duke | 62/135 |
| 3,934,427 A | | 1/1976 | Keyes | 62/342 |
| 4,201,558 A | * | 5/1980 | Schwitters et al. | 62/70 |
| 4,487,337 A | | 12/1984 | DeJardins | 222/129 |
| 4,522,041 A | * | 6/1985 | Menzel | 62/342 |
| 4,528,824 A | | 7/1985 | Herbert | 62/331 |
| 4,538,427 A | | 9/1985 | Cavalli | 62/342 |
| 4,544,084 A | | 10/1985 | Cleland | 222/56 |
| 4,625,525 A | | 12/1986 | Bradbury et al. | 62/330 |
| 4,728,005 A | | 3/1988 | Jacobs et al. | 222/64 |
| 4,869,072 A | | 9/1989 | Sexton et al. | 62/136 |
| 4,900,158 A | | 2/1990 | Ugolini | 366/143 |
| 5,000,352 A | | 3/1991 | Cleland | 222/129 |
| 5,348,753 A | | 9/1994 | Ahnell et al. | 426/231 |
| 5,417,355 A | | 5/1995 | Broussalian et al. | 222/146 |
| 5,419,150 A | | 5/1995 | Kaiser et al. | 62/342 |
| 5,487,493 A | | 1/1996 | McNabb | 222/153 |
| 5,588,558 A | | 12/1996 | Cox et al. | 222/64 |
| 5,713,214 A | | 2/1998 | Ugolini | 62/188 |
| 5,771,917 A | | 6/1998 | Carney et al. | 137/238 |
| 5,799,832 A | | 9/1998 | Mayo | 222/135 |
| 5,813,574 A | | 9/1998 | McNabb | 222/146 |
| 5,906,105 A | | 5/1999 | Ugolini | 62/136 |
| 5,950,448 A | | 9/1999 | Barnes et al. | 62/390 |
| 5,967,226 A | | 10/1999 | Choi | 165/63 |
| 6,082,123 A | | 7/2000 | Johnson | 62/136 |
| 6,490,872 B1 | * | 12/2002 | Beck et al. | 62/66 |
| 6,625,993 B2 | * | 9/2003 | Frank et al. | 62/68 |
| 6,637,214 B1 | * | 10/2003 | Leitzke et al. | 62/68 |

FOREIGN PATENT DOCUMENTS

| | | | | |
|---|---|---|---|---|
| GB | 2154204 A | 9/1985 | | B67D/5/67 |
| GB | 2287306 A | 9/1995 | | F25C/5/02 |

* cited by examiner

*Primary Examiner*—William E. Tapolcai
(74) *Attorney, Agent, or Firm*—Head, Johnson & Kachigian

(57) ABSTRACT

A method of controlling semi-frozen liquid beverage in a dispensing machine having a bowl to contain the beverage, a motor to turn a helical auger blade within the bowl to scrape the semi-frozen beverage, and a compressor to cool the beverage. The method includes the steps of actuating the compressor to the bowl until the temperature of the beverage is cool to reach an initial set point. The compressor is deactivated after temperature of the beverage is cooled at or below a set point. Torque on the motor caused by resistance to the auger blade is sensed after a defined time period following switching off of the compressor. The compressor is activated if the torque on the motor is below a certain level and the temperature set point is lowered from the initial set point to a lower set point in order to cool the product.

9 Claims, 4 Drawing Sheets

SEMI-FROZEN BEVERAGE DISPENSING APPARATUS

This is a Divisional of application Ser. No. 10/261,846, filed Sep. 30, 2002, now U.S. Pat. No. 6,705,106.

BACKGROUND OF THE INVENTION

1. Field of the Invention

The present invention is directed to a semi-frozen liquid beverage dispensing machine and a method of controlling semi-frozen liquid beverage in a dispensing machine.

2. Prior Art

Various known types of beverage devices dispense semi-frozen and chilled liquid beverages. The chilled beverages may take various names such as "sicilian granita" or "slushies". The consistency of the beverage product is a thick slush that stands up in a cup or container. The beverage dispensing device itself typically includes a cylinder within a transparent bowl that visually displays the product wherein the cylinder is refrigerated with refrigerants. In one arrangement, a hollow stainless steel cylinder is arranged horizontally in the bowl. A helical blade driven by an electric motor continually moves across the external portion of the cylinder to scrape off or "harvest" frozen crystals formed by the refrigeration process. Accordingly, over time, the entire contents of the bowl become semi-frozen and the product is mixed while in the bowl.

The solids content (sometimes described as "brix") and consistency of the semi-frozen product should be maintained. If the product is too warm, it turns liquid. If the beverage is cooled too much, the beverage thickness becomes excessive.

Controls have been placed on the refrigerating system in a number of ways. In one arrangement, the compressor will switch off in response to achieving a set temperature. In another arrangement, torque systems measure viscosity of the product through resistance on a dasher or drive motor. The resistance is measured either mechanically or electronically and the measurement is constant whether the compressor is running or not. This type of measurement is somewhat inefficient and causes short cycling of the compressor. While measuring torque in this manner, it can be measuring frost build-up on the evaporator and not the viscosity of the mass in the bowl causing false consistency results and short cycling the compressor.

It is known that when product is placed in the bowl in the liquid state, it will initially be brought down in temperature until it reaches the freeze-down stage. Thereafter, it has been observed that the product begins to thin down. For example, a product that has excellent thickness immediately following an initial freeze-down could be runny several hours later even if the temperature is held constant. This may be due to many factors which include the growth of ice crystals on the evaporator over tire. As water is extracted from the solution to maintain ice crystal growth, more of the syrup components are freed and act as lubricants which stimulate growth of the ice crystals. This effect, combined with a greater disparity between the size of the solid ice crystals and the remaining liquid components results in the thinning down of the product. Accordingly, it has been found that the use of temperature only as a control is unsatisfactory.

In existing torque control systems, a gear motor places an auger drive axle several inches away and radially offset from an electric motor. The motor dangles below the motor drive axle and is allowed several inches of radial arch motion. When the motor is off, when there is no resistance on the auger, the motor hangs directly below the auger drive axle, tripping a limit switch that is mounted to the right of the motor.

The control circuit for the bowl refrigeration is run through the limit switch, causing refrigeration suddenly to open (and the compressor to start) if the motor is dead hanging. When the auger encounters resistance, the electric motor actually rotates radially in a clockwise motion through an arc (defined by the length of offset between the auger drive axle and the motor). This clockwise rotation causes contact with the limit switch to be broken, shutting off refrigeration for the bowl.

It is desirable to provide a system to control product density rather than a system to simply control the temperature in the bowl.

It is desirable to provide a system to control product density rather than a system to monitor and control frost build-up on the evaporator.

The liquid to replenish the bowl must be refilled from time to time. In a typical dispenser, the top of the bowl is removed and liquid is replenished by an attendant. To refill, the liquid mixture is poured from a bulk storage container into the open top by an attendant.

The liquid may be packaged for storage and transportation in various ways. In one type of bulk packaging, a flexible inner storage membrane, such as plastic, is retained within a rigid package such as a cardboard or corrugated box. Various delivery systems are known, for example, those contained in the Applicant's pending U.S. patent application Ser. Nos. 09/650,586 and 09/814,081, each of which is incorporated herein by reference.

There remains a need to provide an integrated beverage dispenser and a storage and delivery mechanism for bulk packaging.

It is also desirable to increase production capacity of a semi-frozen liquid beverage dispenser beyond the capacity of the particular bowl and automatically fill the bowl from bulk storage.

It is also desirable to replenish liquid in the bowl by automatically refilling the liquid dispenser device.

Existing bowl designs for dispensing apparatus will occasionally have a tendency to have inefficient fluid dynamics and consequently develop dead spots wherein icebergs may form thereby causing an unsightly and unappetizing appearance. One solution in the past has been to add additional mechanical mixing sources to minimize this effect.

It would be desirable to provide a novel type of bowl design having a geometric shape which would create sufficient fluid dynamics to eliminate the foregoing inefficiencies and maintain a more consistent semi-frozen beverage product.

In existing designs it is difficult to evacuate all liquid from the bowl thus causing a mess when removing the bowl for cleaning. Some systems employ devices to adjust the bowl at such times.

It would be desirable to have a bowl design that efficiently evacuates the liquid without any manipulation of the bowl.

In existing designs ambient air is allowed to come in contact with the product with all its possible air born contaminates.

It would be desirable to have a system that filtered the air that came in contact with the product.

Existing systems rely on the operator to manually adjust the machine for variables such as consistency and brix for each flavor type.

It would be desirable to have a system that identified the product and automatically adjusted torque and mix ratios.

In existing systems the operator has to manipulate a gasket and place same on the machine to create a seal between the bowl and the machine.

It would be desirable to have a gasket system that attaches easily to the bowl before affixing it to the machine.

SUMMARY OF THE INVENTION

The present invention is a semi-frozen liquid beverage dispensing device and process. The dispenser includes a utility compartment having an operator control interface panel and may include various displays.

The dispenser will include at least one bowl and in the present embodiment, a pair of bowls for dispensing of semi-frozen liquid beverages. Each bowl includes a lever which controls dispensing of the beverage.

The dispenser includes an integrated mix storage area having at least one refrigerated storage cavity to receive a bulk storage container for each bowl. A fluid passageway will extend between the bowl and the bulk storage container so that the bowl will be replenished from time to time. A pump is used to transport liquid product from the bulk storage container through the tube and into the respective bowl.

A cylindrical evaporator extends or projects horizontally into each bowl. A compressor is used to cool the cylindrical evaporator and, in turn, to decrease the temperature of the beverage in the bowl.

An external helical auger blade rotates around the exterior of the cylindrical evaporator to scrape the semi-frozen beverage therefrom. A corresponding internal auger may be utilized to scrape the internal surface of the cylindrical evaporator.

The bowl itself may be at a slight pitch for improved draining and product delivery.

The auger blade is rotated by a drive axle which, in turn, is rotated by an electric gear motor which hangs from the drive axle. As the auger blade encounters resistance, the resistance will tend to rotate the gear motor. As resistance decreases, the gear motor will tend to rotate toward bottom dead center.

The bowl has an elongated cylindrical body with a closed front with the exception of an opening for product delivery controlled by one of the levers. The front and top of the bowl are partially domed and truncated to enhance fluid dynamics. The top of the bowl is entirely closed and has a receptacle which will receive a pin extending from the dispenser in order to lock the bowl in place in the cabinet. The back of the bowl is entirely open and will mate with the wall of the dispenser to form a fluid tight seal.

The dispenser includes an RFID (Radio Frequency Identification) system that is capable of two-way communications with appropriately tagged bulk storage containers and capable of monitoring two different containers in the same mix storage cabinet. The communications will include such things as determining the bulk storage container characteristics and causing internal machine adjustments to occur, initial freeze temperature set point, mix ratio of product to water, begin life cycle of the container, visually identify the flavor on a display, insure product is within code. The RFID system is also used to periodically retrieve technical and marketing/sales data with a smart card.

DETAILED DESCRIPTION OF THE PREFERRED EMBODIMENTS

The embodiments discussed herein are merely illustrative of specific manners in which to make and use the invention and are not to be interpreted as limiting the scope of the present invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
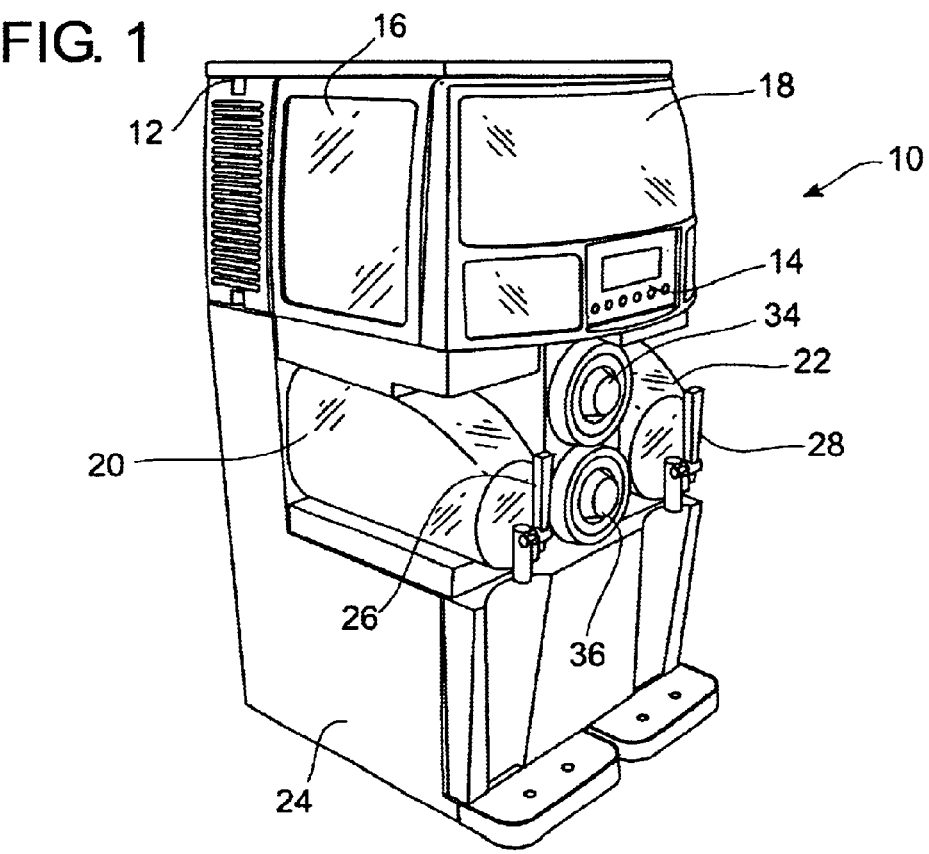
FIG. 1 illustrates a perspective view of a semi-frozen liquid beverage dispensing device constructed in accordance with the present invention.
Figure 2:
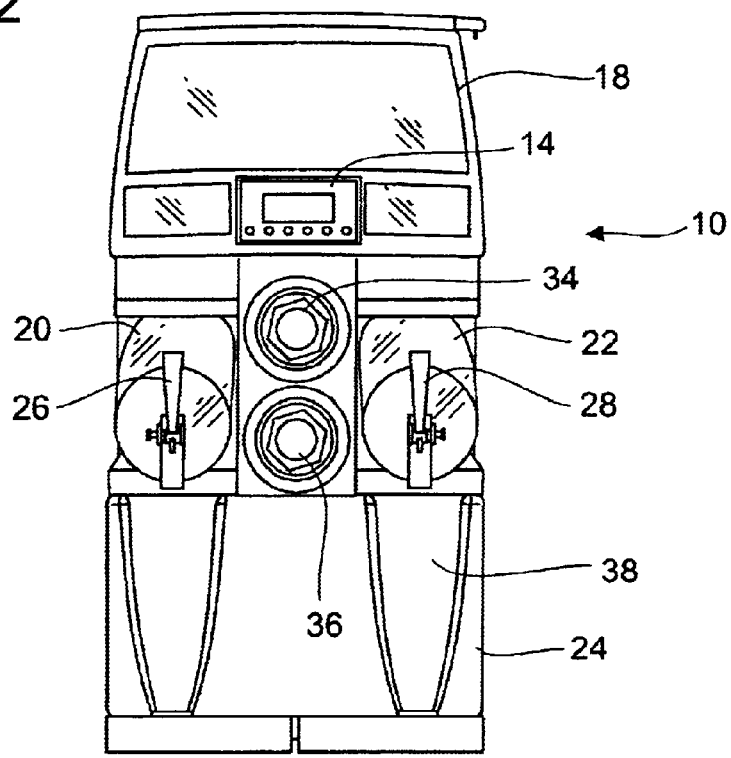
FIG. 2 illustrates a front view of the semi-frozen liquid beverage dispensing device shown in FIG. 1.

Referring to the drawings in detail, FIG. 1 illustrates a perspective view of a semi-frozen liquid beverage dispensing device 10 and FIG. 2 illustrates a front view of the device 10 constructed in accordance with the present invention. The dispenser 10 includes a utility compartment 12 which may be configured in various ways. An operator control interface panel 14 will be used in connection with the process to be described herein.

The dispenser 10 may also include various displays 16 and 18 for advertising which may optionally be illuminated. The dispenser will include at least one bowl, and in the present embodiment, a pair of bowls 20 and 22 for dispensing of the semi-frozen liquid beverages. Each bowl includes a lever 26 and 28 which controls an opening in the bowl to dispense the semi-frozen liquid beverage.

Optional cup dispensers 34 and 36 may be located between the bowls.

The dispenser 10 includes at least one integrated mix storage area, such as refrigerated storage cavity 24 having a door 38. In the present embodiment, the refrigerated storage cavity 24 will receive a pair of bulk storage containers 30 of the liquid beverage. The bulk storage containers will typically include a plastic membrane surrounded by a rigid cardboard or corrugated box. The refrigerated storage cavity 24 retains the liquid beverages in refrigerated but not frozen conditions.

Each bulk storage container may contain a radio frequency identification (REFID) tag which emits a signal received at the dispenser to identify the beverage, the desired temperature set point and other information.

A fluid passageway tube will extend between the bowl and the bulk storage container so that the bowl may be replenished from time to time as will be described herein.

Figure 3:
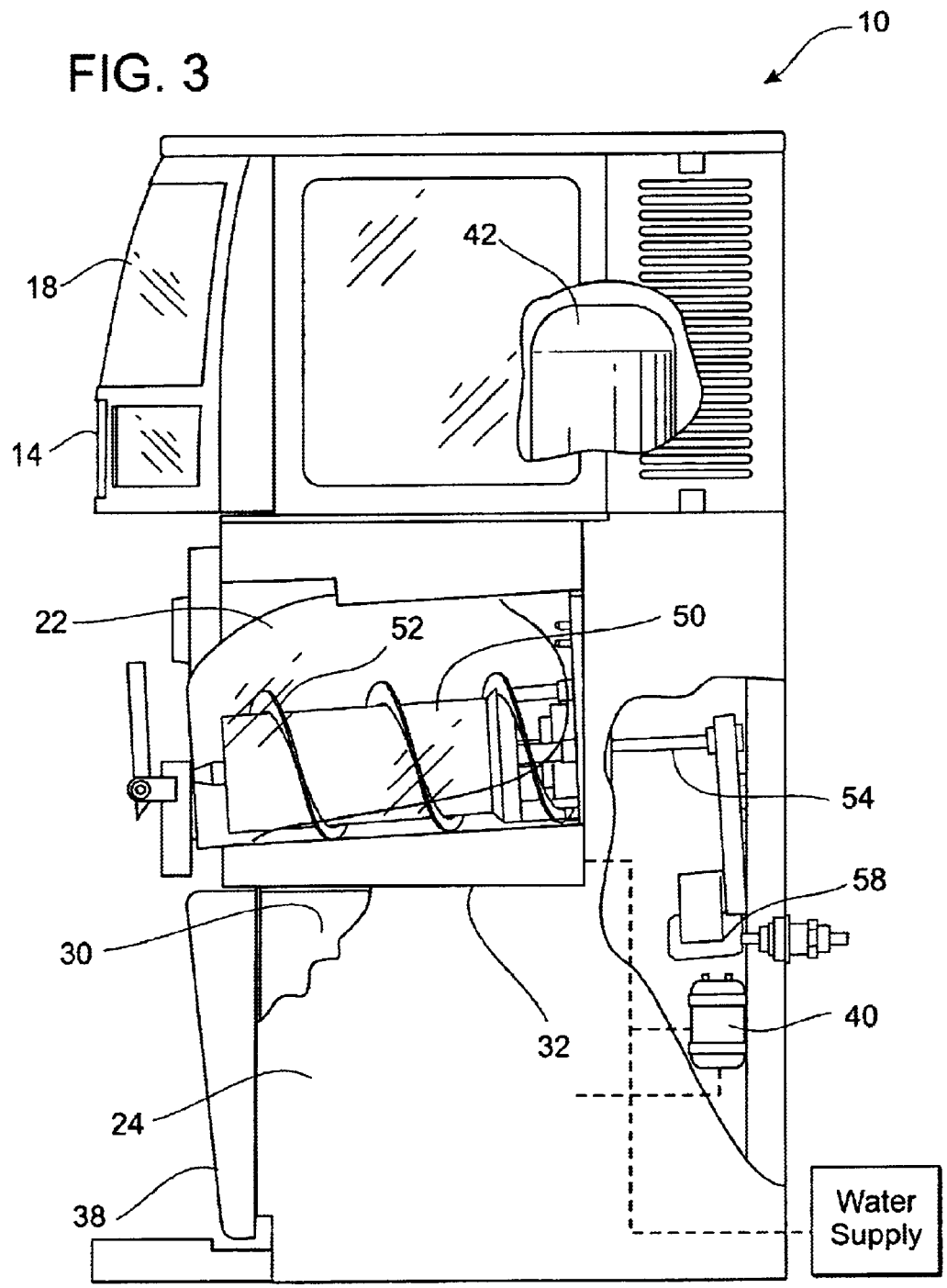
FIG. 3 illustrates a side view of the semi-frozen liquid beverage dispensing device shown in FIG. 1 with portions cut-away for ease of comprehension.

FIG. 3 illustrates a side view of the dispenser which is partially cut away in portions for ease of comprehension.

A pump 40 is used to transport liquid from the bulk storage container through the tube and into the respective bowl. A clock and timer (not visible) is associated with the timer to track times of delivery and give an indication of volume of delivery.

An optional sensor (not shown) would be capable of sensing liquid level of the semi-frozen beverage in the bowl 20 or 22 with the sensor connected to the pump. When the liquid level is below the sensor, the pump 40 would be activated delivering fresh beverage into the bowl.

A stainless steel cylindrical evaporator 50 extends or projects horizontally into each of the bowls 20 and 22. A compressor located above the bowls in a refrigeration assembly 42 is utilized to cool the cylindrical evaporator and, in turn, to decrease the temperature of the beverage in the bowl. A single compressor may be used to refrigerate both bowls 20 and 22.

An external helical auger blade 52 rotates around the exterior of the cylindrical evaporator to scrape the semi-frozen beverage therefrom. The helical auger blade 52 is coaxial with the cylinder. Accordingly, as the beverage decreases in temperature and moves to a semi-frozen state, the auger blade scrapes the cylinder and, at the same time, mixes the product in the bowl. A corresponding internal auger blade (not visible) may also be utilized to scrape the internal surface of the cylindrical evaporator 50.

In the embodiment shown, the bowls 20 and 22 are not parallel to a base 32 of bowl tray 32 but are at a slight pitch, in this case approximately 2° to 3°, for improved draining.

The auger blade 52 is rotated by a drive axle 54.

The drive axle 54 is, in turn, rotated by an electric gear motor 58 which hangs from the drive axle. As the auger blade encounters resistance, it will tend to rotate the gear motor. As resistance decreases, it will rotate toward bottom dead center.

Figure 4:
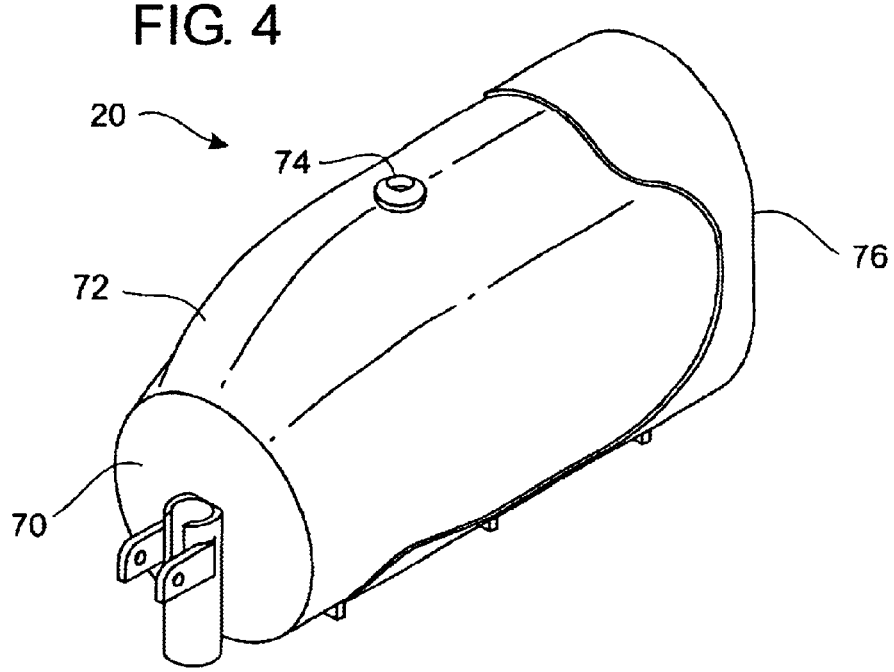
FIG. 4 illustrates a perspective view of a bowl apart from the liquid beverage dispensing device.
Figure 5:
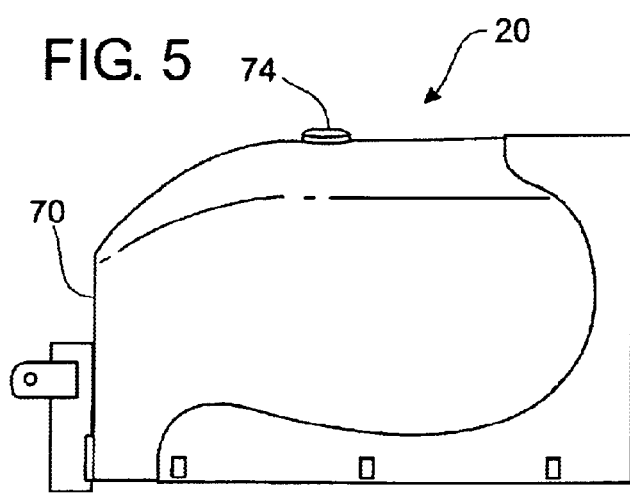
FIG. 5 illustrates a side view of the bowl shown in FIG. 4.
Figure 6:
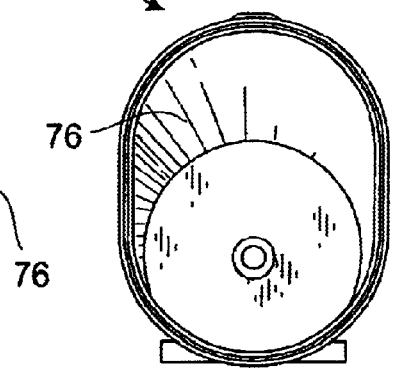
FIG. 6 illustrates a back view of the bowl shown in FIG. 4.

FIG. 4 shows a perspective view and FIG. 5 shows a side view of one of the bowls 20 of the dispenser. The bowl has an elongated cylindrical body with a closed front 70 with the exception of an opening for product delivery which is controlled by the lever 26 (not seen in FIGS. 4 or 5).

The front and top are partially domed and truncated to enhance fluid dynamics. The top of the bowl is entirely closed and has a receptacle 74 which will receive a pin extending from the dispenser in order to lock the bowl in place. The back 76 is entirely open and includes a gasket which will mate with a wall of the dispenser to form a fluid tight seal.

With the bowl design of the present invention, it is possible to pressurize the bowl for use of a carbonated beverage.

Figure 7:
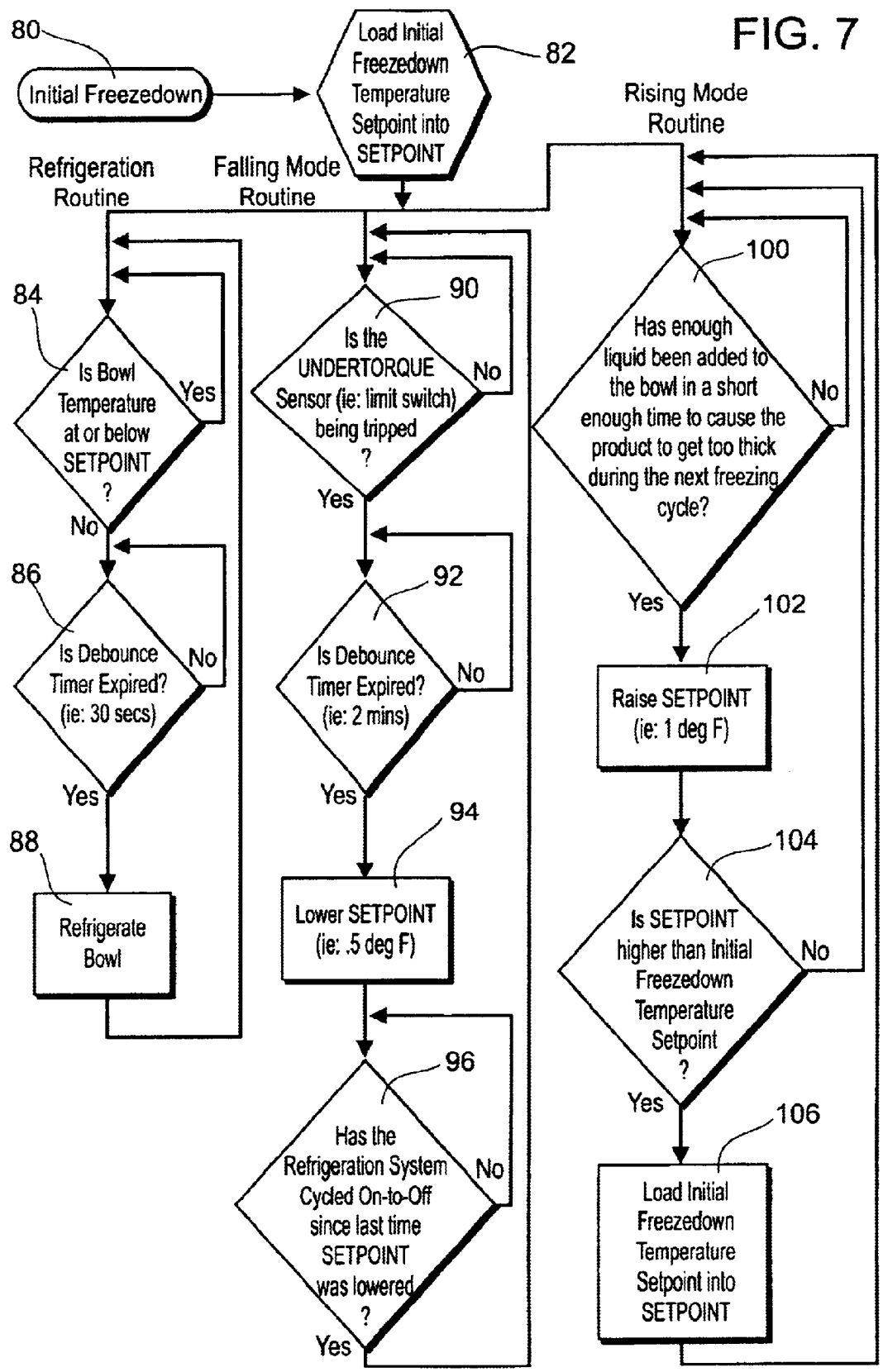
FIG. 7 is a flow chart diagram of a temperature and torque control system which is a part of the semi-frozen liquid beverage dispensing apparatus of the present invention.

FIG. 7 illustrates a flow diagram of the refrigeration control process of the present invention. Three separate independent sub-processes are disclosed and utilized. As seen in FIG. 7, during an initial freeze down shown at 80, the operator will load an initial freeze down set point temperature into a set point control. Alternatively, an initial freeze down temperature set point will be automatically loaded into the controller. During initial freeze down, the product will be brought from a completely liquid state to a thick slush. In one example, the beverage product will achieve an acceptable thickness at about 31° F.

During the refrigeration mode, the compressor will be started to cool the beverage in the bowl. A sensor will determine whether the beverage temperature is at or below the set point as illustrated at diamond 84. If the beverage is at or below the set point, no further action will be taken. If the beverage temperature is not at or below the set point, the debounce timer procedure will be started. In this case, a timer will be initiated to maintain the temperature for a certain period of time, such as 30 seconds, as shown at diamond 86. Once the debounce timer has expired, the compressor will be activated to refrigerate the beverage as shown at box 88. As seen in the sub-process of the falling mode routine, a sensor, such as a mechanical limit switch, potentiometer, strain gauge or other sensing device will monitor torque on the motor 58. In the event that the liquid product is too thin, a reduced torque (or under torque) as described on the electric motor will cause the limit switch to be tripped as seen at diamond 90. If the limit switch is tripped, this will be a yes response as shown at box 90. If the under torque condition is sensed, a timer will be run for a period of time, such as 2 minutes, to ensure the validity of the under torque condition, as shown at diamond 92.

Once the time period has expired, the set point will be lowered by a pre-configured amount (stored in the machine's setup parameters), such as 0.5° F. as shown at box 94.

If the refrigeration system has cycled from on to off since the last time the set point was lowered, then the procedure will recycle to the beginning as shown at box 96.

The third independent sub-process is shown in the rising mode routine. The run time of the pump 40 is monitored in order to give an indication of fresh liquid beverage being pumped from a bulk storage container into one of the bowls. As an alternative to a timer system, the volume of liquid may be monitored. This procedure is shown at box 100.

When a predetermined volume has been added to the bowl, the refrigeration set point will be raised, for example 1° F. as shown at box 102.

A determination will then be made if the set point is higher than the initial freeze down temperature set point as shown at diamond 104. If the answer is no, the procedure will recycle.

If the answer is yes, then the initial freeze down temperature set point will be loaded as the new set point as shown at box 106. Thereafter, the procedure will recycle to the beginning again. With the foregoing procedures, not only will the temperature be monitored and maintained, but the viscosity or thickness of the product will be maintained.

Whereas, the present invention has been described in relation to the drawings attached hereto, it should be understood that other and further modifications, apart from those shown or suggested herein, may be made within the spirit and scope of this invention.

What is claimed is:

1. A semi-frozen liquid beverage dispensing machine having a bowl to contain semi-frozen beverage therein, which apparatus comprises:

at least one refrigerated storage cavity for receiving a bulk storage container of liquid beverage;

a fluid passageway tube extending between said bowl and said bulk storage container wherein said fluid passageway tube is within a refrigerated zone;

said bowl containing a helical auger blade which surrounds a cylindrical evaporator to scrape said semi-frozen beverage;

a pump to transport said liquid from said bulk storage container through said tube and into said bowl outside of said cylinder; and a sensor to sense liquid level of said semi-frozen beverage in said bowl of said machine, said sensor connected to said pump.

2. A self-contained liquid storage and delivery apparatus as set forth in claim 1 wherein said bulk storage container is a flexible membrane bag within a rigid box and includes a connection nipple.

3. A semi-frozen liquid beverage dispensing machine as set forth in claim 1 wherein said bulk storage container includes a radio frequency ID tag which communicates with a transmitter/receiver in said machine.

4. A semi-frozen liquid beverage dispensing machine as set forth in claim 1 wherein said bowl is clear or transparent.

5. A method to store, deliver and automatically fill liquid beverage for supplying a separate, discrete semi-frozen liquid beverage machine having a bowl to contain beverage products, which method comprises:

storing at least one bulk storage container of said beverage products in a refrigerated storage cavity separate and discrete from said liquid beverage machine;

transporting said beverage products from said storage container in said refrigerated storage cavity through a thermally conductive passageway into a bowl of said beverage machine by pumping with a pump wherein said bowl contains a helical auger blade which surrounds a cylindrical evaporator to scrape said semi-frozen beverage;

sensing liquid level with a liquid level sensor in said bowl in order to activate or deactivate said pumping; and activating said pumping to maintain said liquid level at a constant level.

6. A method as set forth in claim 5 including the additional step of removing said bulk storage container of said liquid beverage from said cavity and replacing with another storage container.

7. A method as set forth in claim 5 wherein said bowl is clear or transparent.

8. A method to store, deliver and automatically fill liquid beverage for a semi-frozen liquid beverage machine having a bowl to contain beverage products, which method comprises:

storing at least one bulk storage container of said beverage products in a refrigerated storage cavity within said liquid beverage machine;

transporting said beverage products from said storage container in said refrigerated storage cavity through a thermally conductive passageway into said bowl of said beverage machine, wherein said bowl contains a helical auger blade which surrounds a cylindrical evaporator to scrape said semi-frozen beverage; and delivering water from a water supply to deliver water to a bowl.

9. A method to store, deliver and automatically fill liquid beverage for a semi-frozen liquid beverage machine having a bowl to contain beverage products, which method comprises:

storing at least one bulk storage container of said beverage products in a refrigerated storage within said liquid beverage machine;

transporting said beverage products from said storage container in said refrigerated storage cavity through a thermally conductive passageway into said bowl of said beverage machines wherein said bowl contains a helical auger blade which surrounds a cylindrical evaporator to scrape said semi-frozen beverage; and wherein the step of transporting said liquid beverage includes delivering said liquid beverage to said bowl below the liquid level in said bowl.

* * * * *